(12) United States Patent
Lauster

(10) Patent No.: US 11,212,663 B2
(45) Date of Patent: Dec. 28, 2021

(54) ESTABLISHING A ROAMING CONNECTION VIA A BOOTSTRAP SERVER

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/768,926

(22) PCT Filed: Oct. 16, 2018

(86) PCT No.: PCT/EP2018/078161
§ 371 (c)(1),
(2) Date: Jun. 2, 2020

(87) PCT Pub. No.: WO2019/120682
PCT Pub. Date: Jun. 27, 2019

(65) Prior Publication Data
US 2021/0176622 A1     Jun. 10, 2021

(30) Foreign Application Priority Data
Dec. 22, 2017 (EP) .................................. 17210052

(51) Int. Cl.
*H04W 8/12* (2009.01)
*H04W 76/11* (2018.01)
(Continued)

(52) U.S. Cl.
CPC ............... *H04W 8/12* (2013.01); *H04W 8/24* (2013.01); *H04W 60/04* (2013.01); *H04W 76/11* (2018.02); *H04W 84/042* (2013.01)

(58) Field of Classification Search
CPC .......... H04W 8/12; H04W 7/11; H04W 8/24; H04W 60/04
(Continued)

(56) References Cited

U.S. PATENT DOCUMENTS

2012/0110637 A1* 5/2012 Holtmanns ......... H04W 12/084
726/1
2014/0293796 A1* 10/2014 Jeong ................. H04M 15/66
370/236

(Continued)

OTHER PUBLICATIONS

Qualcom Incorporated, et al. "TS 23.502: Network Sharing in NG RAN; 3GPP Draft S2-178037," 3rd *Generation Partnership Project (3GPP)* (Oct. 30, 2017). XP051360654.
(Continued)

*Primary Examiner* — Congvan Tran
(74) *Attorney, Agent, or Firm* — Leydig, Voit & Mayer, Ltd.

(57) ABSTRACT

A method for establishing a roaming connection over a bootstrap server includes: transmitting, by a communication terminal, a registration request to a network access entity of a visited communication network, wherein the registration request comprises an identification of the communication terminal; forwarding, by the network access entity, the registration request to a bootstrap server of the visited communication network; transmitting, by the bootstrap server, network access data for accessing the visited communication network to the communication terminal based on the identification of the communication terminal, wherein the network access data indicates capabilities of the visited communication network; and establishing, by the communication terminal, the roaming connection via the visited communication network based on the network access data.

16 Claims, 5 Drawing Sheets

(51) Int. Cl.
*H04W 8/24* (2009.01)
*H04W 60/04* (2009.01)
*H04W 84/04* (2009.01)

(58) Field of Classification Search
USPC .......................................................... 370/329
See application file for complete search history.

(56) References Cited

U.S. PATENT DOCUMENTS

2018/0270653 A1* 9/2018 Wifvesson ............ H04W 48/16
2018/0279120 A1* 9/2018 Lehtovirta ............ H04W 12/04

OTHER PUBLICATIONS

Samsung, et al. "Clean-Up of Roaming Sub-Clause of Network Slicing; 3GPP Draft S2-179426," 3*rd* *Generation Partnership Project* (*3GPP*) (Nov. 30, 2017). XP051365664.

* cited by examiner

ESTABLISHING A ROAMING CONNECTION VIA A BOOTSTRAP SERVER

CROSS-REFERENCE TO PRIOR APPLICATIONS

This application is a U.S. National Phase Application under 35 U.S.C. § 371 of International Application No. PCT/EP2018/078161, filed on Oct. 16, 2018, and claims benefit to European Patent Application No. EP 17210052.1, filed on Dec. 22, 2017. The International Application was published in German on Jun. 27, 2019 as WO 2019/120682 A1 under PCT Article 21(2).

FIELD

The present invention relates to a bootstrap server and a method for establishing a roaming connection over a bootstrap server, in particular over a 5G communication network and a bootstrap server in the visited PLMN (public land mobile network) of the 5G communication system. The invention further relates to a corresponding communication terminal (user equipment or mobile terminal).

BACKGROUND

At present, operators all over the world are preparing for the change to 5G networks. For supporting the wide range of services that are intended for 5G, a new core network is provided, which is known under the name "Next Generation Core or NG Core." Its structure is described, for example, in the technical specification TS 23.501 (V.1.5.0) of 3GPP. It specifies requirements for designing and operating a service-oriented 5G core network.

The service-oriented 5G core network is based on the premise that 5G is to support very different services with very different performance requirements. Three different service categories for 5G are identified: 1) enhanced mobile broadband (eMBB), 2) massive machine type communication (mMTC, also known as IoT, Internet of Things), and 3) ultra-reliable low latency communication (UR-LLC).

This includes application cases or use cases such as industrial control, augmented reality (AR) or broadened reality/virtual reality (VR) and linked cars. The aim is the use of end-to-end network slices in order to map these different services and technologies to a physical network infrastructure and support them. In this manner, operators can operate new services in foreign network sectors and include their networks in new industrial value added chains.

For putting the communication terminal into operation, i.e. the mobile terminal, the machine terminal such as the self-driving car or the drone, also generally referred to as user equipment (UE), at present an involved procedure is still necessary when the UE is in the visited network or foreign communication network. This procedure is necessary for taking the subscriber data of the UE from the home network, also called home PLMN (public land mobile network) and notifying them to the UE. These subscriber data of the UE are, for example, registration data of the UE such as identification and telephone number, e.g. IMSI (International Mobile Subscriber Identity). Moreover, for logging in to the visited network, also referred to as "Visited PLMN" (VPLMN), capabilities of the visited PLMN, e.g., network technology, support of specific services, etc., are necessary.

SUMMARY

In an exemplary embodiment, the present invention provides a method for establishing a roaming connection over a bootstrap server. The method includes: transmitting, by a communication terminal, a registration request to a network access entity of a visited communication network, wherein the registration request comprises an identification of the communication terminal; forwarding, by the network access entity, the registration request to a bootstrap server of the visited communication network; transmitting, by the bootstrap server, network access data for accessing the visited communication network to the communication terminal based on the identification of the communication terminal, wherein the network access data indicates capabilities of the visited communication network; and establishing, by the communication terminal, the roaming connection via the visited communication network based on the network access data.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
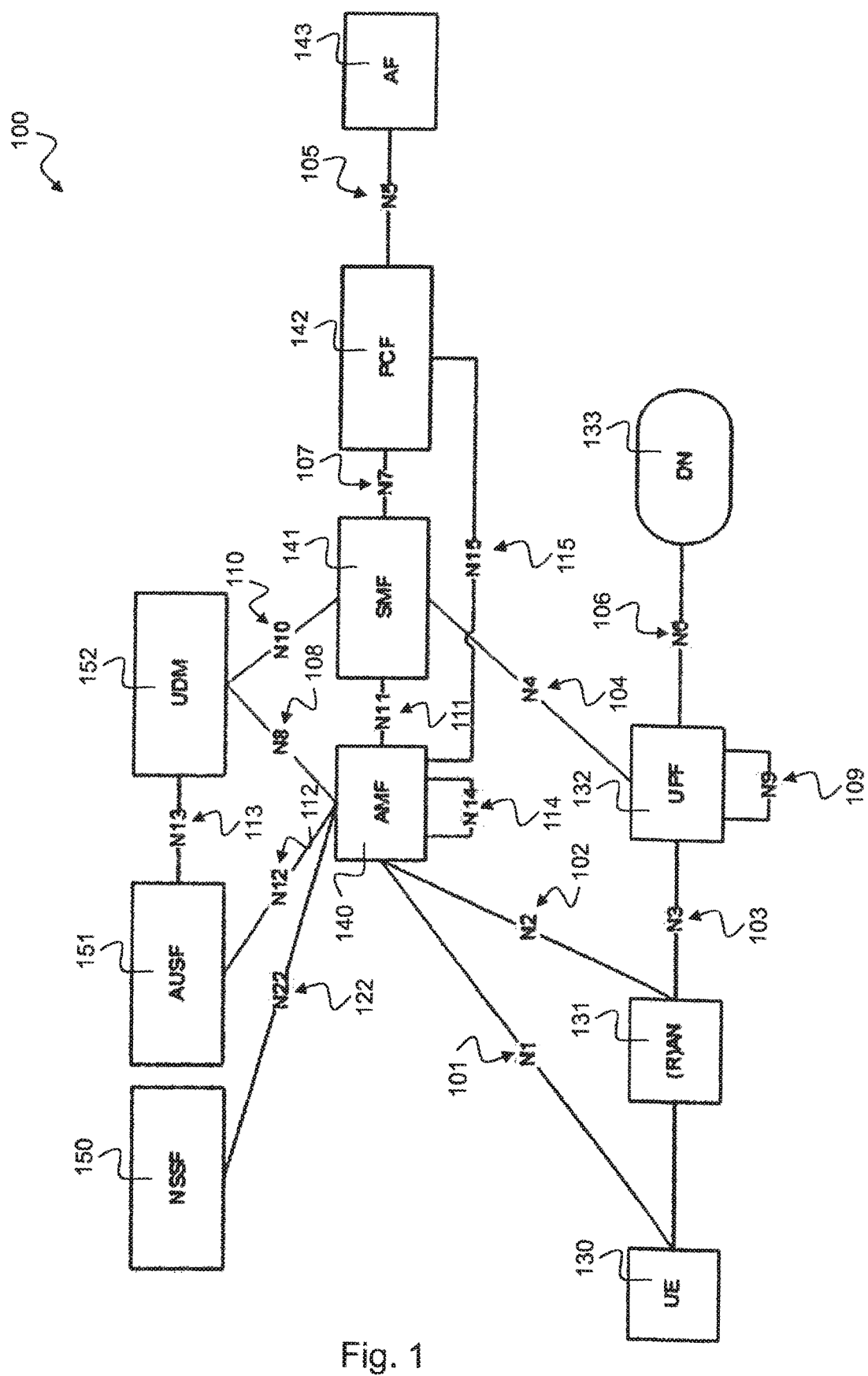
FIG. 1 shows a schematic view of a 5G system architecture 100.

Exemplary embodiments of the present invention accelerate the connection procedure of the UE in the visited PLMN and thus increase the efficiency and flexibility of the communication, in particular during roaming in the 5G communication networks described above.

The methods and systems set out below can take various forms. The individual described elements can be implemented using hardware or software components, for example electronic components that can be produced by various technologies, including, for example, semiconductor chips, application-specific integrated circuits (ASICs), microprocessors, digital signal processors, integrated electrical circuits, electro-optical circuits and/or passive modules.

The devices, systems and methods discussed in the following are suitable for transmitting information via a communication network. The term communication network means the technical infrastructure on which the transmission of signals takes place. The communication network comprises the switching network in which the transmission and switching of the signals between the stationary components and platforms of the mobile communication network or fixed-line network takes place, as well as the access network in which the transmission of the signals between a network access component and the communication terminal takes place. The communication network can comprise both components of a mobile communication network and components of a fixed-line network. In the mobile communication network, the access network is also called air interface and comprises, e.g., a base station (NodeB, eNodeB, radio cell) with mobile communication antenna in order to establish the communication to a communication terminal as described above, for example a mobile phone or smart phone or a mobile component with mobile communication adapter or a machine terminal. In the fixed-line network, the access network comprises, for example, a DSLAM (digital subscriber line access multiplexer) for connecting the communication terminals of a plurality of subscribers in a wired manner. Via the switching network, the communication can be switched further into further networks, for example of other network operators, e.g., foreign networks.

The communication networks discussed in the following can comprise various technologies and network standards, for example according to the 5G system architecture. The latter comprises the concept of network slicing. Network slicing is a form of virtual network architecture which uses the same principles as software defined networking (SDN) and network functions virtualization (NFV) in fixed-line networks. SDN and NFV are used for achieving increased network flexibility by partitioning traditional network architectures into virtual elements that can be linked with each other (also via software).

By network slicing, a plurality of virtual networks can be generated on a common physical infrastructure. The virtual networks are then adapted to the specific requirements of applications, services, devices, customers or operators.

Each virtual network (network slice) comprises an independent set of logical network functions supporting the requirements of the specific application case, wherein the term "logical" relates to software.

Each of these virtual networks or network slices is optimized in order to provide the resources and the network topology for the specific service and traffic using the respective segment. Functions such as speed, capacity, connectivity and coverage are assigned to fulfill the specific requirements of each application case, but functional components can also be used commonly across various network slices.

Each network slice can be isolated completely so that no network slice can disturb the traffic in another network slice. This reduces the risk of introduction and operation of new services and supports also the migration because new technologies or architectures can be started on isolated slices. It also has an effect on security because when a cyber attack breaks through a slice, the attack is trapped and cannot spread beyond this slice.

Each network slice is configured with its own network architecture, its engineering mechanism and its network provision. For this purpose, each network slice can receive management capabilities which, depending on the application case, can be controlled by the network operator or by the customer. The network slices can be managed and orchestrated independently.

According to a first aspect, the invention relates to a method for establishing a roaming connection over a bootstrap server comprising the following steps: transmitting a registration request from a communication terminal to a network access entity of a visited communication network, wherein the registration request comprises an identification (UE ID) of the communication terminal; forwarding the registration request to a bootstrap server of the visited communication network by the network access entity; transmitting network access data for the access to the visited communication network by the bootstrap server to the communication terminal based on the UE ID of the communication terminal, wherein the network access data show capabilities of the visited communication network; and establishing the roaming connection by the communication terminal via the visited communication network based on the network access data. Optionally, the registration request can also comprise a global identification (global PLMN ID) of a public land mobile network (PLMN) and optionally the registration request can be forwarded to the bootstrap server based on the global identification of the PLMN ID.

When using a bootstrap server, the connection procedure of the UE in the visited PLMN can be accelerated because the UE must establish a contact only with the bootstrap server for obtaining all relevant date for establishing a communication connection (roaming) over the visited network. It is no longer necessary to interrogate a plurality of network elements by using a plurality of different interfaces which are probably not even present in the visited network and possibly cause the establishment of the roaming connection to fail. Thus, the efficiency and flexibility of the communication is increased, in particular during roaming in 5G communication networks.

According to an embodiment, the method further comprises transmitting the registration request via at least a frequency band that is dedicatedly determined for connections to the bootstrap server and/or at least a radio access technology (RAT) that is dedicatedly determined for connections to the bootstrap server, e.g. 3G/4G/5G.

This is advantageous that the communication terminal does not have to first search all RATs and all frequency bands and, thus, accelerates the establishment of the connection.

According to an embodiment, the method further comprises transmitting the registration request via a specific network slice of the visited communication network that is dedicatedly determined for connections to the bootstrap server.

This is advantageous in that for establishing the connection, resources of the visited communication network, i.e. of the specific network slice, which are reserved solely for the connection to the bootstrap server can be used, which accelerates the establishment of the connection.

According to an embodiment of the method, the network access data indicate at least one of the following capabilities of the visited communication network: the capability to transmit data and/or speech, number and type of network slices of the visited communication network, support of specific network slice functions, support of 2G/3G, 4G and/or 5G roaming, support of a specific service by the visited communication network.

This is advantageous in that the UE is informed in a simple manner about the capabilities of the visited network and thus can decide whether it can establish a roaming connection, i.e. whether the capabilities of the visited network match the capabilities of the UE. For example, a 4G UE can establish a roaming connection if the visited network supports 4G.

According to an embodiment the method further comprises: determining a PLMN ID of a home communication network of the communication terminal by the bootstrap server based on the UE ID; interrogating user specific registration data of the communication terminal from a database of the home communication network based on a PLMN ID of the home communication network; and transmitting the network access data based on the user specific registration data of the communication terminal.

This is advantageous in that the bootstrap server can interrogate all necessary data from the corresponding network elements, leading to a simplification of the roaming procedure for the UE. Thus, the bootstrap server provides the UE with an image of the data necessary for roaming. Except for the contact address to the bootstrap server, which is determined by the global PLMN, the UE does not need to store any further data.

According to an embodiment, the method comprises: modifying the network access data based on the user specific registration data of the communication terminal by the bootstrap server and transmitting the modified data by the bootstrap server to the communication terminal.

This is advantageous in that the bootstrap server can intervene in the roaming procedure as control instance by providing the UE with only the data that are adapted to its capabilities.

According to an embodiment of the method, the modified data indicate a selection of the capabilities of the visited communication network based on the user specific registration data of the communication terminal.

This is advantageous in that the possible selections of the UE are reduced to the necessary and meaningful ones, so that the roaming procedure in the UE is simplified. Therefore, the UE does not receive any data with which the roaming procedure is not possible at all or is interrupted at a specific point in time. This accelerates the entire connection establishment during roaming.

According to an embodiment of the method, the modified data indicate to the communication terminal which capabilities of the visited communication network are suitable for the communication terminal.

This is advantageous in that the UE can decide in advance whether it wishes to establish a roaming connection over the visited communication network. If the capabilities of the visited network are not suitable, for example in case 4G or 5G is not supported because a circuit-switched VPLMN is concerned, the UE can select roaming over another VPLMN which exhibits the capabilities desired by it even if the signal strength to the respective access point (or base station) is weaker than to the VPLMN that was found first.

According to an embodiment, the method comprises: interrogating the user specific registration data of the communication terminal from the database of the home communication network via a communication interface (B2) between the bootstrap server and the database of the home communication network.

This is advantageous in that the user specific registration data are quickly available via the new communication interface B2 because this interface B2 is specifically adapted for roaming.

According to an embodiment, the method comprises: transmitting the network access data via a communication interface (B1) between the bootstrap server and the communication terminal.

This is advantageous in that the network access data are quickly available to the UE over the new communication interface B1 because this interface B1 is specifically adapted for roaming.

According to an embodiment, the method comprises: interrogating the network access data by the bootstrap server from a database of the visited communication network via a communication interface (B3) between the bootstrap server and the database of the visited communication network.

This is advantageous in that the network access data can be made quickly available to the UE by the bootstrap server via the new communication interface B3 because this interface B3 is specifically adapted for roaming.

According to an embodiment of the method, the interrogation of the network access data by the bootstrap server from the database of the visited communication network is performed in response to the registration request from the communication terminal or during initialization of the bootstrap server in the visited communication network.

This is advantageous in that on the one hand the network access data are only interrogated if they are actually needed so that the bootstrap server does not need a large memory for storing network access data of different UEs. On the other hand, the network access data can be interrogated already during initialization of the bootstrap server so that the roaming procedure can be performed even more quickly because the entire necessary information is already present in the bootstrap server at the specific time.

According to an embodiment of the method, the registration request further comprises an identification of a specific service for which the communication terminal interrogates the visited communication network; and the method further comprises: providing the specific service by the visited communication network based on the identification of the specific service if the visited communication network supports the specific service; and transmitting a PLMN ID of another communication network which supports the specific service by the bootstrap server to the communication terminal if the visited communication network does not support the specific service.

This is advantageous in that the UE is quickly informed whether the visited PLMN supports a specific service and, if not, is referred to a PLMN which supports the interrogated service. This accelerates the roaming procedure significantly.

According to a second aspect of the invention, the invention relates to a bootstrap server for establishing a roaming connection between a communication terminal and a visited communication network, wherein the bootstrap server comprises the following: a communication interface (B1) with the communication terminal for receiving a registration request from the communication terminal, wherein the registration request comprises an identification (UE ID) of the communication terminal; a communication interface (B2) with a home network of the communication terminal for receiving user specific data of the communication terminal; and a processor which is configured to determine network access data for the access of the communication terminal to the visited communication network based on the user specific data of the communication terminal and transmit said network access data to the communication terminal based on the UE ID of the communication terminal, wherein the network access data indicate capabilities of the visited communication network. Optionally, the registration request can also comprise a global identification (global PLMN ID) of a public land mobile network (PLMN).

When using the bootstrap server, the connection procedure of the UE in the visited PLMN can be accelerated because the UE only needs to establish a contact with the bootstrap server for obtaining all relevant data for establishing a communication connection (roaming) over the visited network. It is no longer necessary to interrogate a plurality of network elements by using a plurality of different interfaces which are probably not even present in the visited network and possibly make the establishment of a roaming connection fail. This increases the efficiency and flexibility of the communication, in particular during roaming in 5G communication networks.

According to an embodiment of the bootstrap server, the network access data indicate at least one of the following capabilities of the visited communication network: the capability to transmit data and/or speech, number and type of network slices of the visited communication network, support of specific network slice functions, support of 2G/3G, 4G and/or 5G roaming, support of a specific service by the visited communication network.

This is advantageous in that the UE is informed in a simple manner about the capabilities of the visited network and thus can decide whether it can establish a roaming connection, i.e. whether the capabilities of the visited network match the capabilities of the UE. For example, a 4G UE can establish a roaming connection if the visited network supports 4G.

According to a third aspect, the invention relates to a communication terminal comprising: a communication interface (N1) to a visited communication network for transmitting a registration request to a network access entity of the visited communication network, wherein the registration request comprises an identification (UE ID) of the communication terminal; a communication interface (B1) to a bootstrap server for receiving network access data for the access to the visited communication network, wherein the network access data indicate capabilities of the visited communication network; and a processor which is configured to establish a roaming connection over the visited communication network based on the network access data. Optionally, the registration request can also comprise a global identification (global PLMN ID) of a public land mobile network (PLMN).

When using such a communication terminal together with a bootstrap server, as mentioned above, the connection procedure of the UE in the visited PLMN can be accelerated because the UE only needs to establish a contact with the bootstrap server for obtaining all relevant data for establishing a communication connection (roaming) over the visited network. It is no longer necessary to interrogate a plurality of network elements by using a plurality of different interfaces which are probably not even present in the visited network and possibly make the establishment of a roaming connection fail. This increases the efficiency and flexibility of the communication, in particular during roaming in 5G communication networks.

According to an embodiment of the communication terminal, the communication interface (N1) to the visited communication network comprises a N1 interface of a 5G core network, and the network access entity comprises an AMF entity of the 5G core network.

This is advantageous in that all necessary access control and mobility functions can be performed over the N1 interface to the network access entity. Thus, the resources and the network topology for a specific service and traffic can be provided in an optimum manner. Functions such as speed, capacity, connectivity and coverage can be assigned to the UE via the N1 interface in order to meet the specific requirements of the corresponding application case, but functional components can also be used commonly across various network slices.

According to a fourth aspect, the invention relates to a communication system, in particular a 5G communication network, comprising: a communication terminal according to the third aspect; a visited communication network of the communication terminal; a home communication network of the communication terminal; and a bootstrap server according to the second aspect, which is configured to provide the communication terminal with network access data for the access to the visited communication network, wherein the communication terminal is configured to establish a roaming connection over the visited communication network based on the network access data.

A communication system of this kind offers the advantages described above. This means that when using a communication terminal of this kind together with a bootstrap server, as mentioned above, the connection procedure of the UE in the visited PLMN can be accelerated because the UE only needs to establish a contact with the bootstrap server for obtaining all relevant data for establishing a communication connection (roaming) over the visited network. It is no longer necessary to interrogate a plurality of network elements by using a plurality of different interfaces which are probably not even present in the visited network and possibly make the establishment of a roaming connection fail. This increases the efficiency and flexibility of the communication, in particular during roaming.

In the following detailed description, reference is made to the accompanying drawings, which form part thereof and show specific embodiments, in which the invention can be carried out, for illustration purposes. It goes without saying that other embodiments can also be used and structural or logical modifications can be made without departing from the concept of the present invention. Therefore, the following detailed description should not be taken to be limiting. It also goes without saying that the features of the various embodiments described herein can be combined with other another, unless explicitly specified otherwise.

The aspects and embodiments are described with reference to the drawings, with like reference numerals generally denoting like elements. In the following description, numerous specific details are presented for explanatory purposes, in order to provide a thorough understanding of one or more aspects of the invention. However, it may be obvious to a person skilled in the art that one or more aspects or embodiments can be implemented without adhering so much to the specific details. In other cases, known structures and elements are shown schematically to make it easier to describe one or more aspects or embodiments. It goes without saying that other embodiments can be used and structural or logical modifications can be made without departing from the concept of the present invention.

Even though a particular feature or a particular aspect of an embodiment may have been disclosed in relation to only one of several implementations, a feature or aspect of this kind can also be combined with one or more other features or aspects of the other implementations, as may be desirable or advantageous for a given or particular application. Furthermore, where the expressions "contain", "have", "with" or other variants are used in either the detailed description or the claims, they should also be taken to have a similar meaning to "comprise". The expressions "coupled" and "connected" may have been used together with deviations therefrom. It goes without saying that expressions of this kind are used to indicate that two elements cooperate or interact with each other regardless of whether they are in direct physical or electrical contact or are not in direct contact with one another. Furthermore, the expression "exemplary" is merely meant to indicate an example, not the best or optimum option. The following description should therefore not be taken to be limiting.

In the following, bootstrap servers and functions of such a bootstrap server (bootstrapping server functions) are described. A bootstrapping server function (BSF) characterizes a technical switching element between terminals and servers that have not been known to each other before, said switching element allowing the mutual authentication and—based thereon—the exchange of secret keys and further access information. This allows the use of general additional services and applications which require an authentication and a safe communication relationship.

In the establishment of such a generic security relationship, the following functional elements are involved: terminals, e.g. a mobile phone, i.e. user equipment (UE), which wants to use a specific service, application server, which provides the service, e.g. for mobile TV, VoLTE (Voice over LTE), VoIP (Voice over Internet Protocol), FTP (File Transfer Protocol) data transfer, media streaming, internet browsing, etc., i.e. network application function (NAF), the bootstrapping server function (BSF) itself, which switches a security relationship between UE and NAF, as well as a data base of the home network, e.g. home subscriber server (HSS) or unified data repository (UDR) of the (mobile) network provider, which manages the respective user specific profiles of the users of its terminals.

In this connection, the term bootstrapping characterizes the technical function to first establish a security relationship to a device that has not been known before in terms of security, in order to then be able to install security elements (keys) in the device itself and in the BSF. For example, the protocols Diameter and Hypertext Transfer Protocol (http) can be used. Optionally, also SOAP (Simple Object Access Protocol) can be used instead of Diameter between BSF and NAF.

The BSF is used by the application server (NAF) after a terminal requested service access thereto. Since the application server does not yet know the terminal at this point in time, it first refers it to the BSF. The terminal and the BSF mutually authenticate themselves. This can be done, for example, via the protocol AKA (Authentication and Key Agreement) and by interrogations of the BSF to the home subscriber server (HSS) or the UDR database of the home network. Then, BSF and terminal (UE) agree to a session key that is to be used for the encrypted data exchange with the application server (NAF). If the terminal again contacts the application server, the latter can obtain both the session key and user specific data from the BSF and start data exchange with the terminal (UE). To this end, the matching session keys are used for cryptographic protection.

The security relationship itself, between terminal and server, never leaves the territory of the (mobile) network operator; only data (keys) derived from this security relationship can be interrogated and used by applications.

The bootstrap server described in the present disclosure in particular serves for simplifying the establishment of the roaming connection of the communication terminal, as will be described in the following in the present disclosure.

FIG. 1 shows a schematic view of a 5G system architecture 100. The 5G system architecture 100 comprises the network functions shown in the individual blocks of FIG. 1.

The block UE (user equipment) 130 shows the user equipment or client terminal or mobile communication terminal, which can be operated by the subscriber in order to initiate a communication in the 5G network, i.e. start (mobile originating, MO) or receive (mobile terminating, MT) a communication. The UE can also initiate a communication without user interaction, for example it can be a machine terminal, e.g., for a car or a robot or any other device.

The block (R)AN ((radio) access network) 131 is the (radio) access network via which the UE 130 gains access to the 5G communication network. The interface between UE 130 and (R)AN is either an air interface, in case the access network 131 is a radio network, or a wire-bound interface, in case the access network is a wire-bound network.

The block AMF (access and mobility management function) 140 represents the access and mobility management function. It manages the access and mobility control. The AMF can also have a network slice selection functionality. In case of a wireless access, mobility management is not necessary.

The block SMF (session management function) 141 represents the session management function. It generates sessions and manages them in accordance with the network policy or network planning.

The block UPF (user plane function) 132 represents the user plane function. UPFs can be used in various configurations and places in accordance with the service type.

The block PCF (policy control function) 142 represents the policy (or planning) control function. It provides a policy framework including network slicing, roaming and mobility management. This corresponds to the functionality of a PCRF in 4G systems.

The block UDM (unified data management) 152 provides a common data management. Subscriber data and profiles are stored therewith. This corresponds to the functionality of a HSS in 4G systems, but is used for both the mobile and the wire-bound access in the NG core network.

The block DN (data network) 133 provides the data network over which data are transmitted, e.g. from one UE to another UE.

The block AUSF (authentication server function) 151 provides an authentication functionality via which the subscriber or the UE can log in to the network.

The block AF (application function) 151 provides application functions via which specific services can be carried out.

The block NSSF (network slice selection function) 150 provides functions for selecting specific network slices.

The 5G system architecture shown in FIG. 1 shows the structure of the NG (next generation) network comprising network functions (NFs) and reference points connecting the NFs. The UE 130 is connected to either a radio access network (RAN) 131 or to an access network (AN) 131. Moreover, the UE 130 is connected to the access and mobility function (AMF) 140. The RAN 131 represents a base station which uses new RAT and further developed LTE (Long Term Evolution) technologies, while the AN 131 represents a general base station with non-3GPP access, e.g. WiFi. The next generation core network 100 includes various network functions (NFs). In FIG. 1, there are seven next generation core NFs, namely (1) AMF 140, (2) session management function (SMF) 141, (3) policy control function (PCF) 142, (4) application function (AF) 143, (5) authentication server function (AUSF) 151, (6) user plane function (UPF) 132 and (7) user data management (UDM) 152.

The network function (NF) represents the processing function in NextGen or NG taken over by 3GPP. It has a functional behavior and at the same time serves as an interface. An NF can be implemented either as a network element on a dedicated hardware, as a software instance on a dedicated hardware, or as a virtualized function in an instanced manner on a suitable platform, e.g. a cloud infrastructure.

The AMF 140 offers UE-based authentication, authorization, mobility management, etc. A UE 130 is basically connected to one single AMF 140, because the AMF 140 is independent of the access technology. This means that also a UE 130 with multiple-access technologies is connected to one single AMF 140 only.

The SMF 141 is responsible for session management and assigns IP addresses to the UEs 130. Moreover, the SMF 141 selects the UPF 132 and controls the UPF 132 in view of data transfer. When a UE 130 has a plurality of sessions, different SMFs 141 can be assigned to each session in order to control them individually and possibly provide a plurality of functionalities for each session.

The AF 143 offers information about the packet flow and provides it to the PCF 142, which is responsible for policy control, in order to thus guarantee the quality of service (QoS). Based on this information, the PCF 142 determines the policies relating to mobility and session behavior so that the AMF 140 and SMF 141 function properly.

The AUSF 151 stores data for the authentication of the UE 130, while the UDM 152 stores subscriber data of the UE 130. The data network DN 133, which is not part of the NG core network 100, provides for the internet access and the operator services.

The reference point presentation of the architecture can be used to show detailed message sequences in the next generation (NG) standardization. The reference point next generation (NG) 1 101 is defined as transmission signaling between the UE 130 and the AMF 140. The reference points for the connection between the AN 131 and the AMF 140 and between the AN 131 and the UPF 132 are defined as NG2 102 and NG3 103, respectively. There is no reference point between the AN 131 and the SMF 141, but there is a reference point, NG11 111, between the AMF 140 and the SMF 141. This means that the SMF 141 is controlled by the AMF 140. NG4 104 is used by the SMF 141 and the UPF 132, so that the UPF 132 can be adjusted via the generated control signal of the SMF 141, and the UPF 132 can inform the SMF 141 about its status. NG9 109 is the reference point for the connection between different UPFs 132, and NG14 114 is the reference point between different AMFs 140. NG15 115 and NG7 107 are defined, so that the PCF 142 can apply its policies to the AMF 140 or the SMF 141. NG12 112 is necessary for the AMF 140 being able to perform the authentication of the UE 130. NG8 108 and NG10 110 are defined because the subscriber data of the UE 130 are needed by the AMF 140 and the SMF 141.

The next generation network 100 aims at realizing a separation of the user and the control layer. The user layer transmits the user data traffic, while the control layer transmits the signaling in the network. In FIG. 1, the UPF 132 is in the user layer and all other network functions, i.e. AMF 140, SMF 141, PCF 142, AF 143, AUSF 151 and UDM 152 are in the control layer. The separation of the user and the control layer guarantees the independent scaling of the resources of each network layer. The separation also allows the provision of UPFs 132 in a distributed manner separately from the functions of the control layer.

The NG architecture 100 includes modularized functions. For example, the AMF 140 and the SMF 141 are independent functions in the control layer. Separate AMF 140 and SMF 141 allow an independent development and scaling. Other control layer functions such as the PCF 142 and the AUSF 151 can be separated, as shown in FIG. 1. The modularized function design shown in FIG. 1 also allows the next generation network 100 to flexibly support various services.

Each network function interacts directly with another NF. In the control layer, several interactions between two NFs are defined as service, so that it is possible to reuse them. This service allows the support of modularity. The user layer supports interactions such as the transmission of operations between different UPFs 132.

The next generation network 100 supports roaming in a manner similar to EPS (enhanced packet switching). There are two kinds of application scenarios, on the one hand home routed (HR), on the other hand local breakout (LBO). The structures which support roaming and the corresponding session management in accordance with the concept presented herein will be described in more detail in the following.

Figure 2:
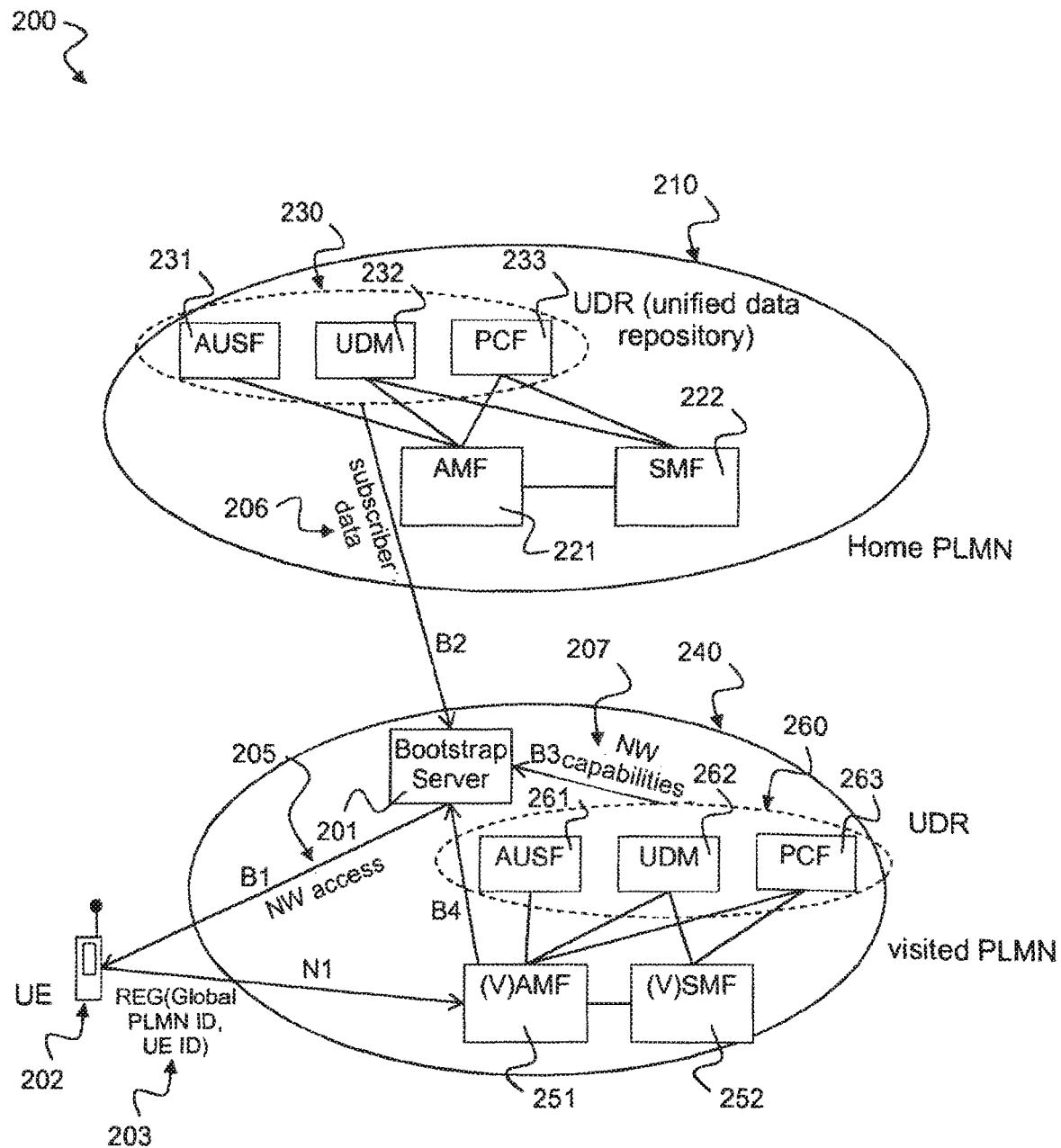
FIG. 2 shows a schematic view of the roaming scenario for a 5G communication network 200 with bootstrap server 201 according to an exemplary embodiment.

FIG. 2 shows a schematic view of the roaming scenario for a 5G communication network 200 with bootstrap server 201 according to an exemplary embodiment. The 5G communication network 200 is divided in a home PLMN (public land mobile network) 210 and a visited PLMN (VPLMN) 240. Both networks 210, 240 have the same structure as that generally described in FIG. 1 above, wherein for the sake of clarity not all network elements are shown in detail. In particular, the visited network 240 comprises an AMF network element 251, here also referred to as (V)AMF, which has the same functionality and the same interfaces as the AMF 140 described above in view of FIG. 1. The visited network 240 further comprises a SMF network element 252, here also referred to as (V)SMF, which has the same functionality and the same interfaces as the SMF 141 described above in view of FIG. 1. The VPLMN 240 further comprises a database (UDR, unified data repository) 260 with the network elements AUSF 261, UDM 262 and PCF 263, which have the same functionality and the same interfaces as the network elements AUSF 151, UDM 152 and PCF 142 described above in view of FIG. 1.

Also the home PLMN 210 comprises the same network elements (with the same functionalities and interfaces), i.e. an AMF network element 221, a SMF network element 222 and a database UDR 230 with the network elements AUSF 231, UDM 232 and PCF 233. The home PLMN is the PLMN in which the communication terminal or the user of the communication terminal is registered, i.e. in which he/she has made a contract with the network operator. The visited PLMN is the PLMN in the network coverage of which the communication terminal or its user is presently staying and over which the user wants to establish a communication, i.e. a roaming connection.

In the visited PLMN there is a bootstrap server 201 which serves for facilitating, i.e. accelerating the establishment of the roaming connection. The bootstrap server is connected via different interfaces to individual network elements of the home PLMN 210 and the VPLMN 240: Via a B1 interface, the bootstrap server 201 is connected to the UE 202. Via a B4 interface, the bootstrap server 201 is connected to the (V)AMF 251 of the VPLMN 240. Via a B3 interface, the bootstrap server 201 is connected to the UDR database 260 of the VPLMN 240. Via a B2 interface, the bootstrap server 201 is connected to the UDR database 230 of the home PLMN 210. Moreover, via a N1 interface, the UE 202 is connected to the (V)AMF 251 of the VPLMN 240 in accordance with the system architecture described above in view of FIG. 1. Via the N1 interface, a registration request 203 with a UE identity (UE ID), e.g. an IMSI of the UE 202, is transmitted. Optionally, the registration request 203 can also comprise a global identification (global PLMN ID) of a public land mobile network (PLMN). Via the UE ID and/or the optional global PLMN ID, a connection with the bootstrap server 201 can be established, which then provides the UE with all necessary data for the network access 205 via the B1 interface. Via the B3 interface, the bootstrap server 201 can interrogate network capabilities of the VPLMN 240 from the UDR database 260 of the VPLMN 240 and, via the B2 interface, it can interrogate subscriber data 206 of the UE 202 from the home PLMN 210 of the UE 202.

In detail, the method for establishing the roaming connection over the bootstrap server 201 can take place as follows: In a first step a registration request 203 is transmitted from the UE 202 to the network access entity or (V)AMF 251 of the VPLMN 240. The registration request 203 comprises the identification (UE ID) of the UE 202. Optionally, the registration request 203 can also comprise the global PLMN ID. The registration request 203 is transmitted to the bootstrap server 201 by the (V)AMF 251 based on the UE ID and/or the optional global PLMN ID, i.e. on the basis of the UE ID and/or the optional global PLMN ID, the (V)AMF 251 notices that the interrogation is an interrogation to the bootstrap server 201 and forwards the interrogation 203 accordingly.

In a further step, the bootstrap server 201 then transmits the network access data 205 for the access to the VPLMN 240 to the UE 202, i.e. based on the UE ID of the UE 202, which indicates to the bootstrap server 201 that the access data 205 should be transmitted via the B1 interface to the UE 202. The network access data 205 show capabilities of the VPLMN 240. Finally, the roaming connection is established by the UE 202 (and the corresponding network elements of the VPLMN 240) over the VPLMN 240 based on the network access data 205.

The registration request 203 can be transmitted over one or more frequency bands which are dedicatedly determined for connections to the bootstrap server 201 and/or via radio access technologies (RAT) which are dedicatedly determined for connections to the bootstrap server, e.g. 3G/4G/5G. This is advantageous in that the communication terminal does not have to first search all RATs and all frequency bands and, thus, accelerates the establishment of the connection.

The registration request 203 can also be transmitted over a specific network slice of the visited communication network, which is dedicatedly determined for connections to the bootstrap server 201. This is advantageous in that for establishing the connection, resources of the visited communication network, i.e. of the specific network slice, which are reserved solely for the connection to the bootstrap server can be used, which accelerates the establishment of the connection.

The network access data 205 indicate, for example, the following capabilities of the VPLMN 240: the capability to transmit data and/or speech, number and type of network slices of the VPLMN 240, support of specific network slice functions, support of 2G/3G, 4G and/or 5G roaming, support of a specific service by the VPLMN 240.

The method can further comprise determining the PLMN ID of a home PLMN 210 of the UE 202 by the bootstrap server 201 based on the UE ID. This means that data are available to the bootstrap server, e.g. in the form of tables or lists, said data indicating in which home network a UE with the identification UE ID is registered. The bootstrap server 201 can further interrogate user specific registration data 206 of the UE 202 from a database 230 of the home PLMN 210 based on the PLMN ID of the home PLMN 210 and can transmit the network access data 205 based on the user specific registration data 206 of the UE 202 to the UE 202.

Before transmitting the network access data 205 to the UE 202, the bootstrap server 201 can modify these network access data 205 based on the user specific registration data 206 of the UE 202 and transmit the modified data to the UE 202. The modified data can indicate, e.g., a selection of the capabilities of the VPLMN 240 based on the user specific registration data 206 of the UE 202. The modified data can, e.g., indicate to the UE 202 which capabilities of the VPLMN 240 are suitable for the UE 202.

The bootstrap server 201 can interrogate the user specific registration data 206 of the UE 202 from the database 230 of the home PLMN 210 via a communication interface B2 between the bootstrap server 201 and the database 230 of the home PLMN 210. This can be a direct interface between the bootstrap server 201 and the network elements of the database 230 or it can be a previously established interface B2 which uses present interfaces according to the 5G system architecture of FIG. 1.

The network access data 205 can be transmitted via a communication interface B1 between the bootstrap server 201 and the UE 202. This interface B1, too, can be a direct interface between the bootstrap server 201 and the UE 202 or it can be a previously established interface B1 which uses present interfaces according to the 5G system architecture of FIG. 1, e.g. the N1 interface between the UE 202 and (V)AMF 251 and the B4 interface between (V)AMF 251 and bootstrap server 201.

The interrogation of the network access data 205 by the bootstrap server 201 from the database 260 of the VPLMN 240 can be performed via a communication interface B3 between the bootstrap server 201 and the database 260 of the VPLMN 240. The interface B3 can be a direct interface between the bootstrap server 201 and the network elements of the database 260 or it can be a previously established interface B3 which uses present interfaces according to the 5G system architecture of FIG. 1.

The interrogation of the network access data 205 by the bootstrap server 201 from the database 260 of the VPLMN 240 can be performed either in response to the registration request 203 from the UE 202 or alternatively during initialization of the bootstrap server 201 in the VPLMN 240.

Furthermore, the registration request 203 can further comprise an identification of a specific service for which the UE 202 interrogates the VPLMN 240. The provision of the specific service by the VPLMN 240 can be performed based on the identification of the specific service if the VPLMN 240 supports the specific service. If the VPLMN 240 does not support the specific service, the bootstrap server 201 can also transmit a PLMN ID of another communication network which supports the specific service.

In the following, an exemplary message transmission procedure for establishing the roaming connection is described. In a first step, the UE 202 registers itself in the network, i.e. the VPLMN 240, with its UE ID and the global PLMN, for example based on the registration message 203 described above. In a second step, the VPLMN 240 forwards the registration 203 to the bootstrap server 201 based on the global PLMN and establishes the interface B1 to the bootstrap server 201. In a third step, the bootstrap server 201 detects the home PLMN 210 of the UE 202 based on the UE ID. In step 4, the bootstrap server 201 obtains the necessary data from the UDR database 230 of the home PLMN 210 via the new B2 interface and necessary data from the UDR database 260 of the VPLMN 240 via the new B3 interface. In step 5, the bootstrap server 201 provides the data from H-UDR 230 and V-UDR 260 to the UE 202 via the B1 interface. Optionally, H-UDR data are modified and supplemented by V-UDR data. In the sixth step, the PLMN is finally selected and the call is established via the data provided by the bootstrap server 201.

Figure 3:
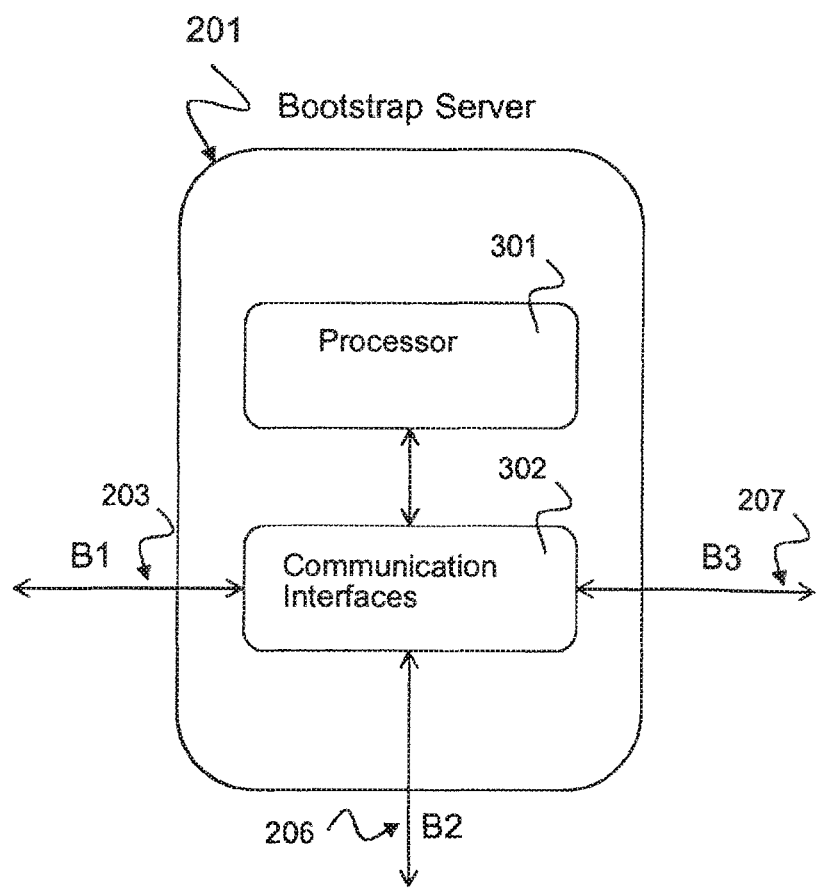
FIG. 3 shows a schematic view of a bootstrap server 201 according to an exemplary embodiment.

FIG. 3 shows a schematic view of a bootstrap server 201 according to an exemplary embodiment. The bootstrap server 201 can be realized in hardware or in software, for example as a BSF (bootstrap server function) as described above. The bootstrap server can be provided in the visited PLMN, as shown in FIG. 2, e.g. in a central area of the visited PLMN or in a network slice of the visited PLMN which is provided especially for this purpose.

The bootstrap server 201 comprises the following three components that have already been described above in view of FIG. 2: a communication interface B1 with the UE 202 for receiving the registration request 203 from the UE 202, which comprises an identification (UE ID) of the UE 202 and optionally the global ID of a PLMN, as described above in view of FIG. 2; a communication interface B2 with the home PLMN 210 of the UE 202 for receiving user specific data 206 of the UE 202, as described above in view of FIG. 2; and a communication interface B3 with the VPLMN 240, in particular the UDR database 260, for receiving information about network capabilities 207 of the VPLMN 240, as described above in view of FIG. 2. The bootstrap server 201 further comprises a processor 301 which is configured to determine network access data 205 for the access of the UE 202 to the VPLMN 240 based on the user specific data 206 of the UE 202 and transmit them to the UE 202 based on the UE ID of the UE 202, wherein the network access data 205 indicate capabilities of the VPLMN 240. The network access data 205 can be determined either solely based on the user data 206 from the home PLMN 210 or additionally with the aid of the network capabilities of the VPLMN 240.

The registration request 203 can be transmitted over one or more frequency bands which are dedicatedly determined for connections to the bootstrap server 201 and/or via radio access technologies (RAT) which are dedicatedly determined for connections to the bootstrap server, e.g. 3G/4G/5G. This is advantageous in that the communication terminal does not have to first search all RATs and all frequency bands and, thus, accelerates the establishment of the connection.

The registration request 203 can also be transmitted over a specific network slice of the visited communication network, which is dedicatedly determined for connections to the bootstrap server 201. This is advantageous in that for establishing the connection, resources of the visited communication network, i.e. of the specific network slice, which are reserved solely for the connection to the bootstrap server can be used, which accelerates the establishment of the connection.

The network access data 205 can indicate, for example, the following capabilities of the VPLMN 240: the capability to transmit data and/or speech, number and type of network slices of the VPLMN 240, support of specific network slice functions of the VPLMN 240, support of 2G/3G, 4G and/or 5G roaming in the VPLMN 240, support of a specific service by the VPLMN 240.

Thus, the bootstrap server 201 forms the central instance in the core network of the VPLMN 240. The bootstrap server 201 provides the UE 202 with all necessary data and, for this purpose, obtains all necessary data from the home PLMN 210 and from the VPLMN 240. The bootstrap server 201 can combine and/or modify data from the home PLMN 210 and data from the VPLMN 240 and provide them to the UE 202. The data can be used for a fast PLMN selection, e.g. determining based on the capabilities (e.g. voice or data) of the VPLMN 240 which slices exist in the VPLMN 240 or can be used for the UE 202, whether 5G roaming is possible or whether only 4G or 2G/3G roaming is possible, which frequency bands are supported, whether specific slice functions are supported and, if not, which other PLMN supports these slice functions. The bootstrap server 201 thus can find a PLMN ID with a slice with the desired service.

The data from the VPLMN 240 can be added to the data from the home PLMN 210 or modify the data from the home PLMN 210. New interfaces to the bootstrap server 201 are introduced, namely B1, B2, B3, as described above in view of FIG. 2. The global PLMN serves the UE 202 for establishing a contact with the bootstrap server 201. The bootstrap server 201 provides possible PLMNs with IDs via which the UE 202 can make contact. The UE 202 cannot only log in for a roaming connection over a VPLMN 240, as exemplarily shown in FIG. 2, but it can log in to a plurality of different VPLMNs for establishing a roaming connection. The bootstrap server 201 serves for indicating the suitable VPLMNs to the UE. The bootstrap server 201 thus can make a pre-selection of suitable VPLMNs, so that the connection procedure is accelerated because the UE 202 can immediately select the correct PLMN.

Figure 4:
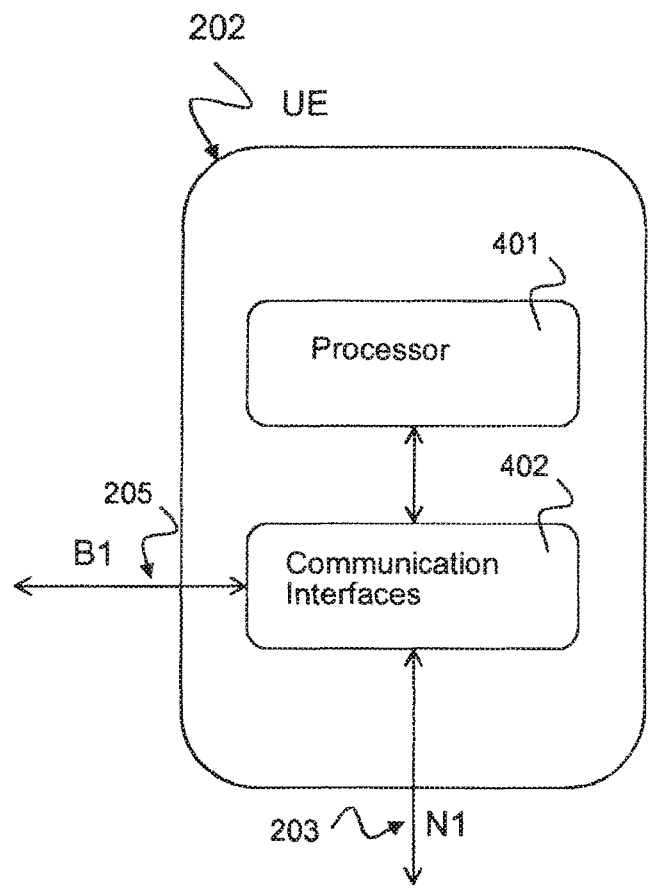
FIG. 4 shows a schematic view of a UE 202 according to an exemplary embodiment.

FIG. 4 shows a schematic view of a UE 202 according to an exemplary embodiment. The UE 202 comprises the following two communication interfaces already described above in view of FIG. 2: a communication interface N1 to the VPLMN 240 for transmitting a registration request 203 to a network access entity 251 of the VPLMN 240, as described above in view of FIG. 2. The registration request 203 comprises an identification (UE ID) of the UE 202 and optionally the global ID of a PLMN; a communication interface B1 to a bootstrap server 201 for receiving network access data 205 for the access to the VPLMN 240, as described above in view of FIG. 2. The network access data 205 indicate capabilities of the VPLMN 240. The UE 202 further comprises a processor 401 which is configured to establish a roaming connection over the VPLMN 240 based on the network access data 205.

The communication interface N1 to the visited communication network can comprise, e.g., an N1 interface of a 5G core network, as described above in view of FIG. 1 and FIG. 2. The network access entity 251 can comprise an AMF entity of the 5G core network, as described above in view of FIGS. 1 and 2.

The communication terminal and the bootstrap server are arranged in a communication system 200, as described in FIG. 2, in particular a 5G communication network. The communication system 200 comprises the UE 202, the VPLMN 240 of the UE 202, the home PLMN 210 of the UE 202 and the bootstrap server 201 described above, which is configured to provide the UE 202 with network access data 205 for the access to the VPLMN 240, as described above in view of FIG. 2. The UE 202 is further configured to establish a roaming connection over the VPLMN 240 based on the network access data 205.

Figure 5:
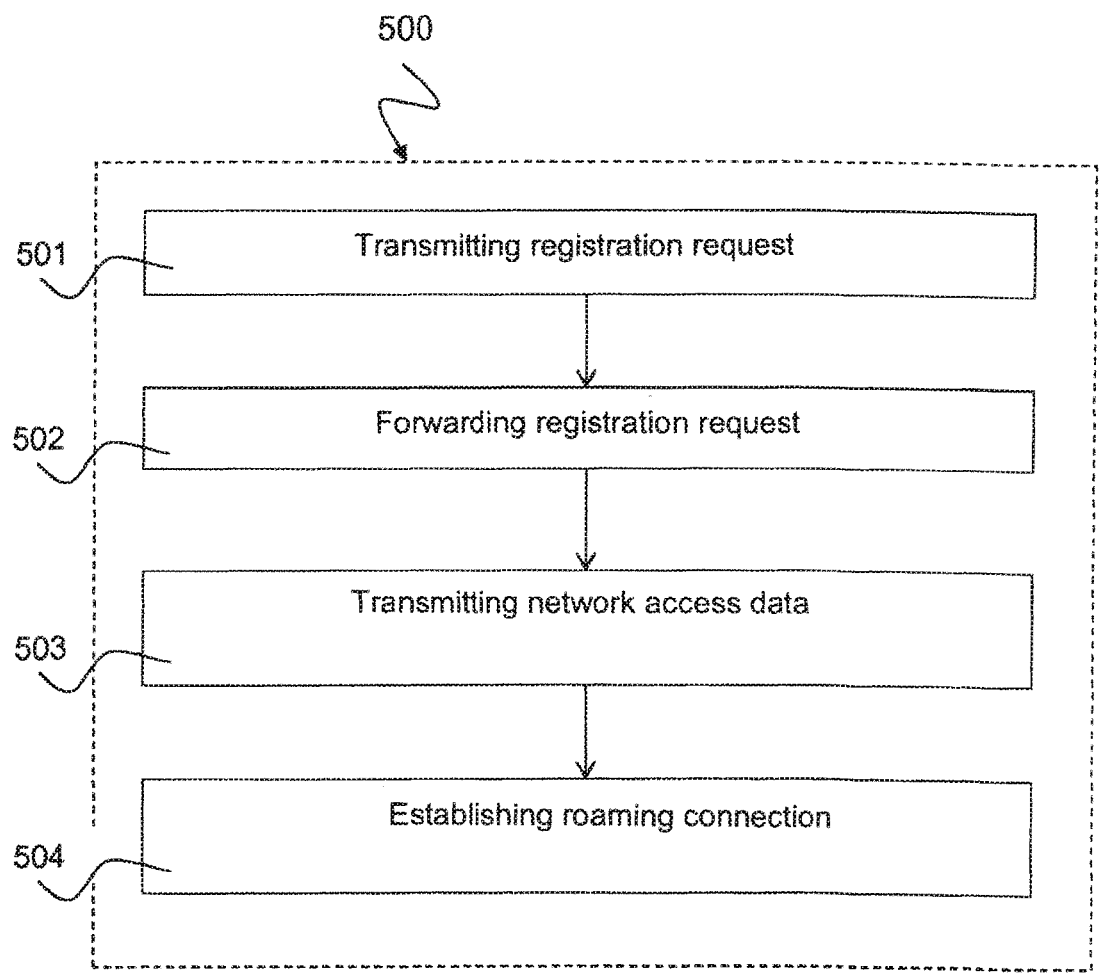
FIG. 5 shows a schematic view of a roaming method 500 according to an exemplary embodiment.

FIG. 5 shows a schematic view of a roaming method 500 according to an exemplary embodiment.

The method 500 serves for establishing a roaming connection over a bootstrap server 201, as described, e.g., in FIGS. 2 and 3, and comprises the following steps: transmitting 501 a registration request 203 from a UE 202 to a network access entity 251 of a VPLMN 240, wherein the registration request 203 comprises an identification (UE ID) of the UE 202 and optionally a global identification (global PLMN ID) of a public land mobile network (PLMN), as described above in view of FIG. 2; forwarding 502 the registration request 203 to a bootstrap server 201 of the VPLMN 240 by the network access entity 251, as described above in view of FIG. 2; transmitting 503 network access data 205 for the access to the VPLMN 240 by the bootstrap server 201 to the UE 202 based on the UE ID of the UE 202, wherein the network access data 205 indicate capabilities of the VPLMN 240, as described above in view of FIG. 2; and establishing 504 a roaming connection by the UE 202 over the VPLMN 240 based on the network access data 205.

The method 500 can comprise further steps, for example steps corresponding to the method steps described above in view of FIG. 2.

An aspect of the invention also comprises a computer program product which can be loaded directly into the internal memory of a digital computer and comprises software code segments via which the method 400 described in view of FIG. 4 or the procedures described in view of FIGS. 3 and 5 can be carried out when the product is running on a computer. The computer program product can be stored on a non-transitory medium of the computer and comprise a computer-readable program which causes a computer to execute the method 400 or implement or control the network components of the communication networks described in FIGS. 1 to 5.

The computer can be a personal computer (PC), for example a PC of a computer network. The computer can be realized as a chip, an ASIC, a microprocessor or a signal processor and arranged in a computer network, for example in a communication network as described in FIGS. 1 to 5.

It goes without saying that the features of the various embodiments described herein by way of example can be combined with one another, unless specifically stated otherwise. As indicated in the description and drawings, individual elements described as being connected to one another need not be directly interconnected; intermediate elements may be provided between the connected elements. It also goes without saying that embodiments of the invention can be implemented in individual circuits, partially integrated circuits or fully integrated circuits, or programming. The term "for example" is merely meant to indicate an example, not the best or optimum option. Particular embodiments have been illustrated and described here, but it is obvious to a person skilled in the art that a number of alternative and/or equivalent implementations can be realized in place of the embodiments shown and described without departing from the concept of the present invention.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing a roaming connection, the method comprising:
   transmitting, by a communication terminal, a registration request to a network access entity of a visited communication network, wherein the registration request comprises an identification of the communication terminal;
   forwarding, by the network access entity of the visited communication network, the registration request to a bootstrap server of the visited communication network;
   transmitting, by the bootstrap server of the visited communication network, network access data for accessing the visited communication network to the communication terminal based on the identification of the communication terminal, wherein the network access data indicates capabilities of the visited communication network; and
   establishing, by the communication terminal, the roaming connection via the visited communication network based on the network access data provided by the bootstrap server of the visited communication network.

2. The method according to claim 1, further comprising:
   transmitting the registration request via at least a frequency band that is dedicatedly determined for connections to the bootstrap server and/or at least a radio access technology (RAT) that is dedicatedly determined for connections to the bootstrap server.

3. The method according to claim 1, further comprising:
   transmitting the registration request via a specific network slice of the visited communication network which is dedicatedly determined for connections to the bootstrap server.

4. The method according to claim 1, wherein the network access data indicates at least one of the following capabilities of the visited communication network:
   the capability to transmit data and/or speech,
   number and type of network slices of the visited communication network,
   support of specific network slice functions,
   support of 2G/3G, 4G and/or 5G roaming, or
   support of a specific service by the visited communication network.

5. The method according to claim 1, further comprising:
   determining, by the bootstrap server, a global public land mobile network identification (PLMN ID) of a home communication network of the communication terminal based on the identification of the communication terminal;
   interrogating user-specific registration data of the communication terminal from a database of the home communication network based on the global PLMN ID of the home communication network; and
   transmitting network access data based on the user-specific registration data of the communication terminal.

6. The method according to claim 5, further comprising:
   modifying, by the bootstrap server, the network access data based on the user specific registration data of the communication terminal; and
   transmitting, by the bootstrap server, the modified data to the communication terminal.

7. The method according to claim 6, wherein the modified data indicates a selection of the capabilities of the visited communication network based on the user-specific registration data of the communication terminal.

8. The method according to claim 6, wherein the modified data indicates to the communication terminal which capabilities of the visited communication network are suitable for the communication terminal.

9. The method according to claim 5, further comprising:
interrogating the user-specific registration data of the communication terminal from the database of the home communication network via a communication interface between the bootstrap server and the database of the home communication network.

10. The method according to claim 1, further comprising:
transmitting the network access data via a communication interface between the bootstrap server and the communication terminal.

11. The method according to claim 1, further comprising:
interrogating, by the bootstrap server, the network access data from a database of the visited communication network via a communication interface between the bootstrap server and the database of the visited communication network.

12. The method according to claim 11, wherein:
the interrogation of the network access data by the bootstrap server from the database of the visited communication network is performed in response to the registration request from the communication terminal; or
the interrogation of the network access data is performed during initialization of the bootstrap server in the visited communication network.

13. The method according to claim 1, wherein the registration request further comprises an identification of a specific service for which the communication terminal interrogates the visited communication network; and
wherein the method further comprises: providing, by the visited communication network, the specific service by the visited communication network based on the identification of the specific service, wherein the visited communication network supports the specific service.

14. The method according to claim 1, wherein the registration request further comprises an identification of a specific service for which the communication terminal interrogates the visited communication network; and
wherein the method further comprises: transmitting, by the bootstrap server, a public land mobile network identification (PLMN ID) of another communication network which supports the specific service to the communication terminal, wherein the visited communication network does not support the specific service.

15. A bootstrap server for establishing a roaming connection between a communication terminal and a visited communication network, wherein the bootstrap server comprises:
a first communication interface with the communication terminal for receiving for receiving a registration request from the communication terminal, wherein the registration request comprises an identification of the communication terminal;
a second communication interface with a home network of the communication terminal for receiving user-specific data of the communication terminal; and
a processor configured to:
determine, based on the user-specific data of the communication terminal, network access data for the communication terminal to access the visited communication network; and
transmit the network access data to the communication terminal based on the identification of the communication terminal;
wherein the bootstrap server is part of the visited communication network; and
wherein the network access data indicates capabilities of the visited communication network and is usable by the communication terminal for establishment of the roaming connection to the visited communication network.

16. The bootstrap server according to claim 15, wherein the network access data indicates at least one of the following capabilities of the visited communication network:
the capability to transmit data and/or speech,
number and type of network slices of the visited communication network,
support of specific network slice functions,
support of 2G/3G, 4G and/or 5G roaming, or
support of a specific service by the visited communication network.

* * * * *